United States Patent [19]

Namekawa

[11] Patent Number: 4,905,271
[45] Date of Patent: * Feb. 27, 1990

[54] METHOD OF PREVENTING AUTO THEFT

[75] Inventor: Makoto Namekawa, Twaki, Japan

[73] Assignee: Alpine Electronics Inc., Tokyo, Japan

[*] Notice: The portion of the term of this patent subsequent to Feb. 28, 2006 has been disclaimed.

[21] Appl. No.: 274,533

[22] Filed: Nov. 21, 1988

Related U.S. Application Data

[63] Continuation of Ser. No. 102,234, Sep. 28, 1987, abandoned, which is a continuation of Ser. No. 881,894, Jul. 3, 1986, abandoned.

[51] Int. Cl.⁴ .............................................. H01Q 7/04
[52] U.S. Cl. ...................................... 379/58; 455/127; 455/343; 340/539; 340/825.31; 379/44; 379/63
[58] Field of Search ........................ 379/58, 59, 63, 44; 340/529, 825.31; 455/343, 127, 54, 56; 235/385, 375

[56] References Cited

U.S. PATENT DOCUMENTS

| | | | |
|---|---|---|---|
| 4,219,698 | 8/1980 | Birilli et al. | 379/37 |
| 4,558,181 | 10/1985 | Blanchard et al. | 379/107 |
| 4,567,472 | 1/1986 | Shirai et al. | 340/525 |
| 4,577,182 | 3/1986 | Millsap et al. | 340/539 |
| 4,631,527 | 12/1986 | De Witt et al. | 340/539 |
| 4,651,157 | 3/1987 | Gray et al. | 342/457 |
| 4,670,746 | 6/1987 | Taniguchi et al. | 340/825.31 |
| 4,672,375 | 6/1987 | Mochida et al. | 340/825.31 |
| 4,672,653 | 6/1987 | Loveless | 379/39 |
| 4,700,375 | 10/1987 | Reed | 379/61 |
| 4,710,745 | 12/1987 | Del Rosario | 340/63 |
| 4,809,316 | 2/1989 | Namekawa | 379/58 |

Primary Examiner—Robert Lev
Attorney, Agent, or Firm—Guy W. Shoup; Stephen L. Malaska; Paul J. Winters

[57] ABSTRACT

A method of preventing auto theft utilizes an anti-theft system and a mobile telephone system. When abnormality indicative possible auto theft occurs, the anti-theft system transmits that fact to a remote control unit, which thereby sounds an alarm. The anti-theft system at the same time turns on the power of the mobile telepone system so as to make it ready for being capable of external calls, so that the driver who is remote from the car can ascertain the state of the anti-theft system by calling the mobile telephone system before running to the car.

3 Claims, 3 Drawing Sheets

METHOD OF PREVENTING AUTO THEFT

This application is a continuation of application Ser. No. 07/102,234, filed Sept. 28, 1987, now abandoned, which is a continuation of application Ser. No. 06/881,894, filed July 3, 1986 now abandoned.

BACKGROUND OF THE INVENTION

1. Field of the Invention

The present invention relates to a method of preventing auto theft, and more particularly, to a method of preventing the theft of an automobile which is equipped with a mobile telephone system and an anti-theft system.

2. Description of the Prior Art

Anti-theft devices which prevent auto theft are conventionally known. When a thief attempts to steal a car incorporating such an anti-theft system by opening a door of the car, applying considerable force to the car, or opening the trunk, the anti-theft system is actuated to cause a siren to blow or the headlamps to be turned on and off, thereby obstructing the attempted theft.

However, the alarm sounded by the siren or flashing of the headlamps is only effective if there are people nearby, and does not exhibit sufficient deterrent in deserted locations or at night.

SUMMARY OF THE INVENTION

Accordingly, it is an object of the present invention to provide a method of preventing auto theft which effectively prevents theft even when the driver is at some distance from the car or at night.

It is another object of the present invention to provide a method of preventing auto theft which enables the occurrence of something unusual to be noticed even when the driver is at some distance from the car.

It is still another object of the present invention to provide a method of preventing auto theft which enables the actual state of the anti-theft system to be ascertained by utilizing an external telephone when something unusual occurs relating to possible theft.

To achieve this aim, a method of preventing auto theft according to the present invention introduces the following improvements in the conventional anti-theft system and mobile telephone system.

Referring to FIG. 1, which is a block diagram of a system to which a method of preventing auto theft according to the present invention is applied, the symbol MTS denotes a mobile telephone system and MSP an anti-theft system.

The mobile telephone system MTS includes a control unit 101, a transceiver unit 102, a T-connector 103 and an antenna 104.

The anti-theft system MSP includes a sensor portion 201 for detecting abnormality relating to possible theft, an operation portion 202 provided with numeral keys and function keys, a control portion 203 having a micro computer structure, a timer 204, a transmission/reception portion 205, and a remote control unit 206, known as a "pager", which externally turns on and off the anti-theft function and outputs an alarm indicating the occurrence of something unusual.

The control unit 101 and the transceiver unit 102 are connected such as to allow communication between the two by power source control lines, digital data transmission/reception lines, sound lines and the like. Several necessary lines are selected from them and are connected to the control portion 203 of the anti-theft system MSP through the T-connector 103.

When the driver leaves the car, the anti-theft system MSP is actuated by operating the operation portion 202 or the remote control unit 206, and the power of the mobile telephone system MTS is turned off.

If the anti-theft system MSP detects something unusual indicative of possible theft in this state, the control portion 203 of the anti-theft system transmits that fact to the remote control unit 206 through the transmission portion 205 and at the same time turns on the power of the mobile telephone system MTS such as to render it capable of receiving calls from an external telephone.

The remote control unit 206 receives the information as to the occurrence of something unusual and sounds the alarm by means of a buzzer or the like, whereby the owner of the car is made aware of the fact that something unusual has occurred with his car.

Even when the car is not actually being stolen, the remote control unit sometimes sounds the alarm because the shock sensor is actuated by force applied from the outside, or because a noise sensor is actuated by excessive external noise. If the owner wants to ascertain the state of the anti-theft system before running to the car in such a case, it is possible to call the mobile telephone system from an external telephone, and ascertain the state of the anti-theft system by inputting a predetermined ID code and thereafter inputting a code selected from codes which have been predetermined in accordance with various kinds of circumstances.

The above and other objects, features and advantages of the present invention will become clear from the following description of the preferred embodiment thereof, taken in conjunction with the accompanying drawings.

DESCRIPTION OF THE PREFERRED EMBODIMENT

Figure 1:
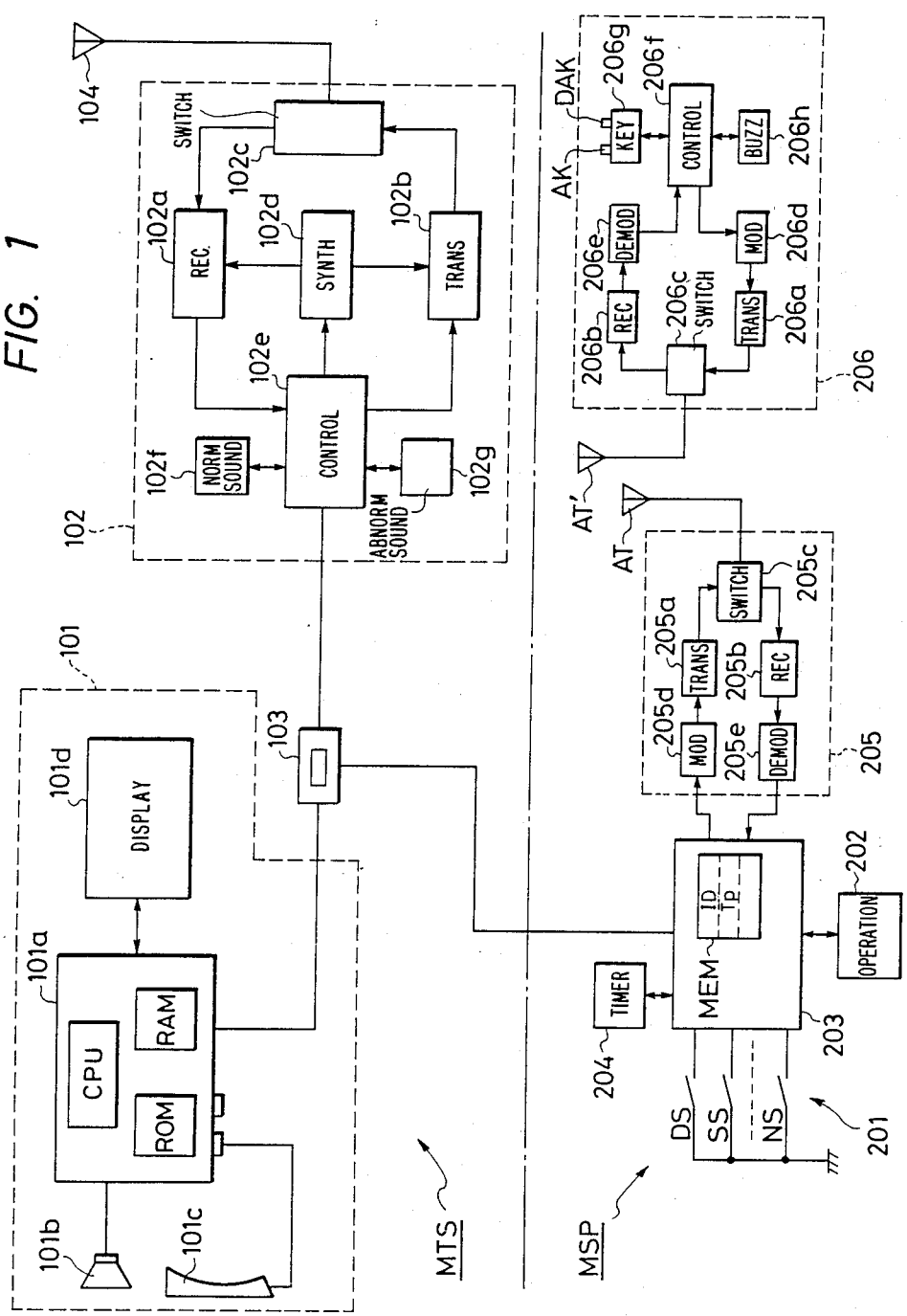
FIG. 1 is a block diagram of a system to which a method of preventing auto theft according to the present invention is applied.

FIG. 1 is a block diagram of a system to which a method of preventing auto theft according to the present invention is applied.

The symbol MTS denotes a cellular mobile telephone system and the symbol MSP an anti-theft system. The cellular system is a method of communicating with receivers at various stations by dividing a service area into a plurality of cells of about 6.4 Km in radius, in each of which a wireless telephone station (base station) is provided, and subsequently changing the station from which electric waves are received by the telephone provided within a car as the car travels to different areas.

The mobile telephone system MTS includes a control unit 101, a transceiver unit 102, a T-connector 103 and an antenna 104.

Figure 3:
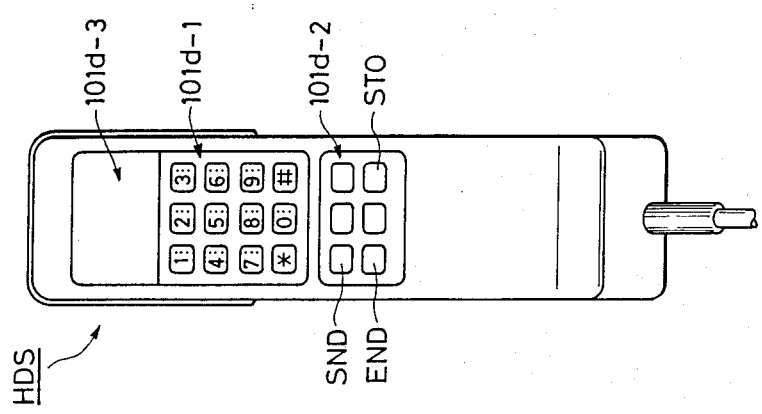
FIG. 3 is a view of the surface of a handset.
Figure 2:
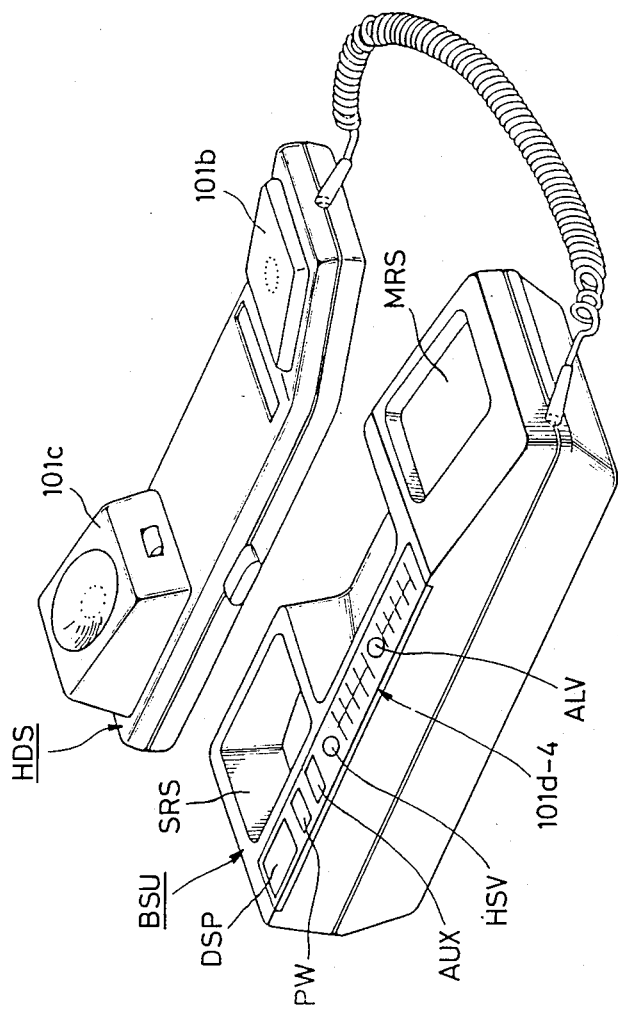
FIG. 2 is an external view of a control unit.

The control unit 101 has, electrically, a control portion 101a having a computer structure, a microphone 101b, a speaker 101c, and an operation and display portion 101d. The control unit 101 is, mechanically, composed of a handset HDS and a base unit BSU, as shown in FIG. 2. The microphone 101b and the speaker 101c are provided on the reverse side of the handset HDS, and on the upper side thereof, are provided, as shown in FIG. 3, a ten-key portion 101d-1 for inputting a telephone number or the like, a function key portion 101d-2 having a send key SND and an end key END, etc., and a display portion 101d-3 which displays a dialled number.

The base unit BSU has, as shown in FIG. 2, a panel portion 101d-4, a speaker receiving portion SRS and a microphone receiving portion MRS. The panel portion 101d-4 is provided with an on/off power switch PW, an auxiliary switch AUX, an alert volume control portion ALV for controlling the speaker level of a ringing tone, a handset volume control portion HSV for controlling the volume of the receiving tone of the handset HDS and a display portion for displaying various values. The ten-key portion 101d-1, the function key portion 101d-2, the display portion DSP 101d-3 of the handset HDS together with the panel portion 101d-4 of the base unit BSU constitute the operation and display portion 101d shown in FIG. 1.

The transceiver unit 102 includes a reception portion 102a, a transmission portion 102b, a switching portion 102c for connecting the antenna 104 to the reception portion or the transmission portion by appropriate change-over, a synthesizer 102d for producing a predetermined frequency signal, a control portion 102e, a normal state identification sound generator 102f which produces a sound indicating that nothing unusual is occurring which would be suggestive of theft, e.g., peep, peep... and an abnormal state identification sound generator 102g which produces a sound indicating that something unusual suggestive of theft is occurring, e.g., beep, beep. . . . The normal state identification sound generator 102f and the abnormal state identification sound generator 102g may be united as one sound synthesizer which outputs suitable words or the above-described sounds depending on whether the state is normal or abnormal.

The anti-theft system MSP includes a sensor portion 201 for detecting something unusual indicative of possible theft, the operation portion 202 having a keyboard structure, the control portion 203 having a micro computer structure, the timer 204, the transmission/reception portion 205 and the remote control unit 206, known as a "pager", which turns on and off the anti-theft function and outputs an alarm indicating the occurrence of something unusual.

The sensor portion 201 includes a door sensor DS for detecting the opening and closing of a door, a shock sensor SS for detecting any shock exceeding a predetermined value, a noise sensor NS for detecting any noise within the car exceeding a predetermined value, a sensor for detecting the opening and closing of a trunk, etc.

The operation portion 202 which has a ten-key portion and function keys is operated (a) when setting an ID code (registered number) in the memory MEM of the control portion 203, (b) when setting in the memory MEM of the control portion 203 the period during which the power of the mobile telephone system MTS is to be kept on when something unusual is detected or (c) when actuating the anti-theft function of the anti-theft system or releasing the actuated state of the anti-theft function. The ID code is input in order to ascertain the state of the anti-theft system MSP by means of a push-button telephone, or when the alarm state which the anti-theft system has assumed at the time of the occurrence of abnormality is released.

The timer 204 starts timing under an instruction from the control portion 203, which makes inquiry as to the elapsed time t as occasion demands.

The transmission/reception portion 205 includes a transmission portion 205a, a reception portion 205b, a switching portion 205c for connecting the antenna AT to the transmission portion 205a or the reception portion 205b by appropriate change-over, a modulation portion 205d for modulating the digital data which is output by the control portion 203 at a predetermined frequency signal, and a demodulation portion 205e for demodulating the signal which is input from the reception portion 205b and inputting it to the control portion 203.

The remote control unit 206 includes a transmission portion 206a, a reception portion 206b, a switching portion 206c for connecting an antenna AT' to the transmission portion 206a or the reception portion 206b by appropriate change-over, a modulation portion 206d, a demodulation portion 206e, a control portion 206f, a key portion 206g having a key AK (which is called an arming key) for actuating the anti-theft function of the anti-theft system MSP and a key DAK (which is called a disarming key) for releasing the actuated state of the anti-theft function, and a buzzer 206h for outputting the alarm indicating the fact that something unusual has occurred.

The control unit 101 of the mobile telephone system MTS and the transceiver unit 102 are connected with each other by a plurality of power control lines, digital data transmission/reception lines, sound lines, etc, from which necessary lines are selected and connected to the control portion 203 of the anti-theft system MSP by the T-connector 103. In other words, the power control line, the data transmitting line, and the data receiving line, namely three lines in total, are connected to the control portion 203 of the anti-theft system MSP through the T-connector 103.

A method of preventing auto theft according to the present invention will now be described with reference to the flowchart shown in FIG. 4.

The operation portion 202 of the anti-theft system MSP is operated in advance to set the power-on keeping time $T_p$ (the period during which the power of the mobile telephone system MTS is to be kept on) and store it in the memory MEM of the controller 203. Similarly, the ID code is set by operation portion 202 and stored in the memory MEM.

When the driver leaves the car, the power of the anti-theft system MSP is turned on, while the mobile telephone system is turned off by operating the power on/off switch of the mobile telephone system MTS (FIG. 2).

In this state, the following steps are executed.

(1) Constant monitoring is performed by the processor of the control portion 203 of the anti-theft system MSP to establish whether or not the sensor portion 201 has detected any abnormality.

(2) Other processing is executed if there is no abnormality.

(3) If abnormality has occurred and the predetermined sensor is turned on, the control portion 203 of the anti-theft system MSP immediately identifies this fact and inputs a predetermined code signal indicating the occurrence of abnormality to the remote control unit 206 through the transmission/reception portion 205.

(4) Immediately after the remote control unit 206 receives the code indicating the occurrence of abnormality, the control portion 206f outputs an alarm by actuating the buzzer 206h. The buzzer 206h is automatically turned off after a predetermined time, or is turned off by pressing a stop key (not shown) provided on the key portion 206g.

(5) If abnormality has occurred, the control portion 203 outputs a power enable signal (a signal of a high level) to the power control line simultaneously with the execution of the steps (3) and (4), thereby turning on the power of the mobile telephone system MTS and instructing the timer 204 to start timing.

(6) The processor of the control portion 203 reads the elapsed time t from the timer 204 as occasion demands, and judgement is made as to whether the elapsed time t exceeds the power-on duration time $T_p$.

(7) If $t > T_p$, the control portion 203 turns off the power of the mobile telephone system MTS.

(8) On the other hand, if $t \leq T_p$, judgement is made by the control portion 203 as to whether or not a calling command has been input from the transceiver unit 102 until the elapsed time t exceeds the power-on duration time $T_p$.

(9) When the control portion 102b of the transceiver unit 102 of the mobile telephone system MTS is called, it executes an ordinary call-reception processing, and at the same time inputs the calling command to the control portion 203 of the anti-theft system MSP, whereby the control portion 203 keeps the mobile telephone system in the engaged state. When the owner of the car hears the buzzer (alarm) of the remote control unit 206, he calls the mobile telephone system MTS from an external telephone. In other words, when the alarm is sounded by the remote control unit, the owner is made aware of the fact that something unusual has happened with the car, but the owner will want to ascertain the actual state of the anti-theft system MSP before running to the car himself in the following cases:

(a) The car is not actually being stolen but the remote control unit 206 has sounded the alarm because the shock sensor has been actuated by force applied from the outside, because the noise sensor has been actuated due to excessive external noise, or for other reasons;

(b) A thief is stealing the car but it is dangerous for the owner to run to the car alone. In such cases, the owner calls the mobile telephone system.

(10) The control portion 203 waits for the ID code of the anti-theft system MSP to be delivered. It is necessary to use a push-button telephone when inquiring as to the state of the anti-theft system, because the ID code must be delivered.

(11) While the ID code remains un-delivered, judgement is made as to whether or not $t > T_p$ at suitable moments until the ID code is transmitted. If $t > T_p$, the step (7) is executed.

(12) When the ID code is delivered, the control portion 102e of the transceiver unit 102 inputs the ID code to the control portion 203 of the anti-theft system MSP.

(13) The processor of the control portion 203 judges whether or not the ID code delivered from the transceiver unit agrees with the ID code stored in the memory MEM. If NO, the process returns to the step (7).

(14) If the ID code delivered agrees with the ID code stored, the control portion 203 transmits that fact to the transceiver unit 102.

(15) Thereafter, the control portion 203 waits for some of the predetermined circumstance codes to be delivered, these being set in advance in accordance with various kinds of circumstances. For example, (a) #1 is a code for inquiring as to whether or not the anti-theft system is in the actuated state;

(b) #2 is a code for inquiring as to whether or not the anti-theft system is in the non-actuated state;

(c) #3 is a code for inquiring as to whether the door sensor is on or off; and (d) #4 is a code for inquiring as to whether the shock sensor is on or off.

(16) If no circumstance code is delivered, the control portion 203 reads the elapsed time t from the timer 204 as occasion demands, and judgement is made as to whether the elapsed time t exceeds the power-on duration time $T_p$, and if YES, the step (7) is executed.

(17) If a circumstance code is delivered, the control portion 203 decodes it, and informs the control portion 102e of the transceiver unit 102 of the state of the anti-theft system corresponding to the code. For example, if the circumstance code #3 is delivered, the control portion 203 checks the on/off state of the door sensor DS which detects the opened or closed state of a door, and outputs a code signal corresponding to the on/off state.

(18) The control portion 102e of the transceiver unit 102 actuates either of the normal state identification sound generator 102f or the abnormal state identification sound generator 102g depending on whether the door sensor DS is on or off, and produces the sound having a tone which corresponds thereto. If the door sensor is on, it indicates the abnormal state and, the sound, e.g., peep, peep. . . is produced, whereas if the door sensor is off, it indicates the normal state and, the sound, e.g., beep, beep. . . is produced. The owner at the other end is thereby able to confirm whether the door is closed or open.

(19) Judgement is made as to whether or not the anti-theft system MSP is in the END state by the control portion 203.

(20) The control portion 203 judges whether or not t $T_p$, and if $t > T_p$, the process returns to the step (7), whereas if $t \leq T_p$, the steps (15) to (20) are repeated until an ensuing circumstance code is delivered. In this way, the owner ascertains the state of the anti-theft system MSP by repeating the steps (15) to (20).

(21) If YES in the step (19), the control portion 203 of the anti-theft system inputs an on-hook signal, whereby the mobile telephone system MTS is immediately restored to its original state for being ready for calls. Thereafter the process returns to the step (7), and the power of the mobile telephone system is turned off.

According to the present invention, as described above, when something unusual occurs indicative of possible auto theft, that fact is transmitted to the remote control unit which turns on/off the power of the anti-theft system MSP, the power of the mobile telephone system is turned on so as to be capable of receiving external calls, and the remote control unit sounds an alarm. As a result, the owner of the car is made aware of the fact that something unusual has occurred with the car even at night, and even when he is at some distance from the car, so that the theft of the car is effectively prevented.

Furthermore, the present invention enables the power of the mobile telephone system to be turned on when abnormality is detected so as to be capable of receiving external calls, and the state of the anti-theft system is made known to the caller under at least one condition that a predetermined ID code is input from an external telephone to the mobile telephone system. Accordingly, it is possible to ascertain the state of the anti-theft system correctly and to take appropriate measures before running to the car.

While there has been described what is at present considered to be a preferred embodiment of the invention, it will be understood that various modifications may be made thereto, and it is intended that the appended claims cover all such modifications as fall within the true spirit and scope of the invention.

What is claimed is:

1. A method of preventing the theft of an automobile which is equipped with a mobile telephone system and an anti-theft system for preventing a car from being stolen, said method comprising the steps of:

providing said anti-theft system with a remote control unit which actuates said anti-theft system or releases the actuated state of said anti-theft system and which sounds an alarm when receiving the information as to the occurrence of abnormality indicative of possible auto theft from said anti-theft system; and providing a means for ascertaining the state of said anti-theft system when said alarm is sounded by receiving a call from an external telephone to said mobile telephone system, the power of which is turned on so as to be capable of receiving external calls by said anti-theft system at the time of the occurrence of abnormality, and transmitting information corresponding to the state of said anti-theft system to said external telephone.

2. A method of preventing the theft of an automobile according to claim 1, wherein said mobile telephone system reports the state of said anti-theft system to a caller under at least one condition that said mobile telephone system receives a call from said caller when the power of said mobile telephone system is on and a predetermined ID code is input.

3. A method of preventing the theft of an automobile according to claim 2, wherein codes are predetermined in accordance with various kinds of circumstances, and when one of said predetermined codes is input after inputting said ID code, the state of said anti-theft system corresponding to said code is reported to said caller.

* * * * *

UNITED STATES PATENT AND TRADEMARK OFFICE
CERTIFICATE OF CORRECTION

PATENT NO. : 4,905,271

DATED : February 27, 1990

INVENTOR(S) : Makoto Namekawa

It is certified that error appears in the above-identified patent and that said Letters Patent is hereby corrected as shown below:

On the title page, insert the Japanese priority patent information as shown below:

--[30]    Foreign Application Priority Data
    July 9, 1985  [JP]   Japan...............60-150644

Figure 4:
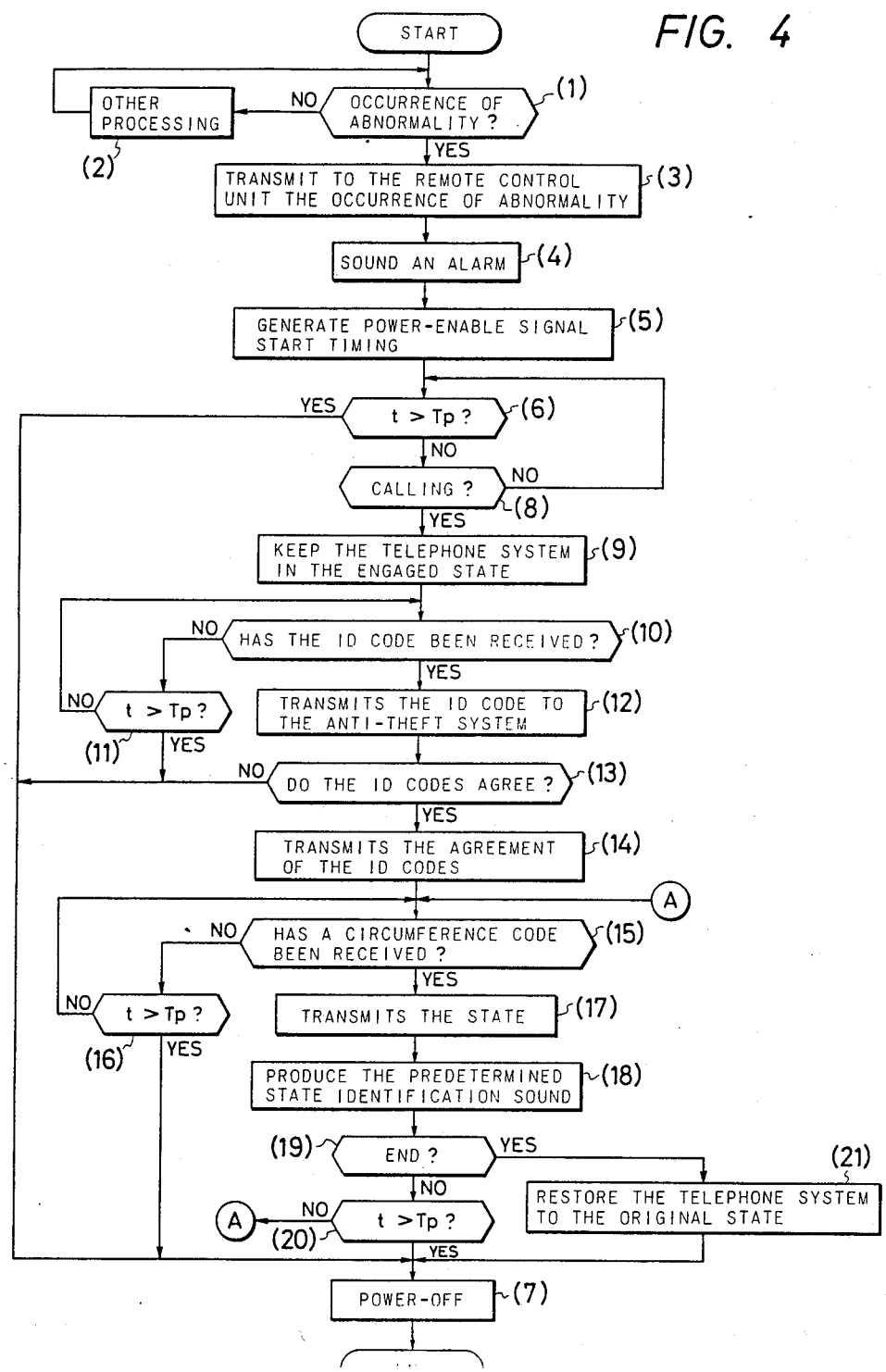
FIG. 4 is a flowchart of the process of the method according to the present invention.

In the drawings, Fig. 4, box "(15)", "circumference" should read --circumstance--.

Signed and Sealed this

Twenty-third Day of July, 1991

Attest:

HARRY F. MANBECK, JR.

Attesting Officer

Commissioner of Patents and Trademarks